US012432836B2

(12) United States Patent
Lee et al.

(10) Patent No.: US 12,432,836 B2
(45) Date of Patent: Sep. 30, 2025

(54) LED FIXTURE, PORTABLE WIRELESS ELECTRONIC DEVICE, AND METHOD OF PROVISIONING LED FIXTURES IN A WIRELESS NETWORK

(71) Applicant: Cypress Semiconductor Corporation, San Jose, CA (US)

(72) Inventors: Ho Chun Lee, HongKong (HK); Kam Shing Li, Cambridgeshire (GB); Wenbin Yu, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 177 days.

(21) Appl. No.: 17/958,878

(22) Filed: Oct. 3, 2022

(65) Prior Publication Data

US 2024/0114609 A1 Apr. 4, 2024

(51) Int. Cl.
*H05B 47/19* (2020.01)
*H05B 47/155* (2020.01)

(52) U.S. Cl.
CPC ........... *H05B 47/19* (2020.01); *H05B 47/155* (2020.01)

(58) Field of Classification Search
CPC ...... H05B 47/19; H05B 47/155; H05B 47/11; H05B 47/1985; H05B 47/1965
See application file for complete search history.

(56) References Cited

U.S. PATENT DOCUMENTS

| | | | | |
|---|---|---|---|---|
| 9,386,643 | B2 * | 7/2016 | Feri | H04B 10/116 |
| 10,485,069 | B2 * | 11/2019 | Seki | G09F 13/005 |
| 10,778,330 | B1 * | 9/2020 | Zoller | H04B 10/502 |
| 11,057,108 | B1 * | 7/2021 | Mondragon | H04B 10/516 |
| 2015/0028763 | A1 * | 1/2015 | Feri | H05B 47/195 315/210 |
| 2017/0149499 | A1 * | 5/2017 | Frodsham | H04B 10/116 |
| 2017/0339561 | A1 * | 11/2017 | Wennemyr | H04L 67/125 |
| 2019/0109640 | A1 * | 4/2019 | Shilling | H04L 61/10 |
| 2019/0132055 | A1 * | 5/2019 | Deixler | H05B 47/199 |
| 2019/0191521 | A1 * | 6/2019 | Kim | H05B 47/115 |
| 2019/0268992 | A1 * | 8/2019 | Seki | H05B 45/385 |
| 2019/0342005 | A1 * | 11/2019 | Verma | H04B 10/116 |
| 2020/0037421 | A1 * | 1/2020 | Beij | H04B 10/116 |
| 2022/0201473 | A1 * | 6/2022 | Alpert | H04W 12/06 |
| 2022/0416889 | A1 * | 12/2022 | Desai | H04B 17/318 |

* cited by examiner

*Primary Examiner* — Raymond R Chai

(57) ABSTRACT

A method of provisioning LED fixtures in a wireless network includes: detecting nonvisible light emitted by each of the LED fixtures, using a portable wireless electronic device that comes into range of each of the LED fixtures one at a time; extracting, from the detected nonvisible light for each of the LED fixtures, a unique node ID assigned to each of the LED fixtures; and provisioning each of the LED fixtures into the wireless network, based on the unique ID extracted from the detected nonvisible light for each of the LED fixtures. Embodiments of the LED fixtures and a portable wireless electronic device used as part of the provisioning method are also described.

18 Claims, 12 Drawing Sheets

| | |
|---|---|
| Mesh node UUID 400 | 694157CF-16D2-4FD7-9119-3B5F81796C1A |
| Mesh network UUID 402 | A07A104E-6B11-CAC9-7774-6002B05FFF00 |
| Mesh node unicast address 404 | "0002" |
| Mesh Node ID 406 | VLC-X57D7 |
| Mesh Node ID 408 | VLC7AA00002 |

FIG. 4

LED FIXTURE, PORTABLE WIRELESS ELECTRONIC DEVICE, AND METHOD OF PROVISIONING LED FIXTURES IN A WIRELESS NETWORK

BACKGROUND

Provisioning LED (light emitting diode) fixtures in a wireless network for large spaces such as warehouses, office buildings, shopping centers, factories, schools, hospitals, etc. is a costly and time-consuming process. LED fixtures capable of interconnection via a wireless network are assigned a unique ID in written form or as a QR code. Prior to installation, a trained specialist is needed on site to register and mark each LED fixture and to associate each LED fixture with a specific location. This procedure is expensive and lengthy, particularly for a very large deployment, e.g., thousands of LED fixtures.

Thus, there is a need for an improved approach for provisioning LED fixtures in a wireless network.

SUMMARY

According to an embodiment of a LED fixture, the LED fixture comprises: an LED or string of LEDs; an LED driver configured to regulate power to the LED or string of LEDs; network connectivity circuitry configured to interface with a wireless network of LED fixtures; and modulation circuitry configured to modulate nonvisible light emitted by the LED or string of LEDs with a unique node ID assigned to the LED fixture, to broadcast the unique node ID via electromagnetic radiation towards a portable wireless electronic device in range of the modulated nonvisible light.

According to an embodiment of a portable wireless electronic device, the portable wireless electronic device comprises: light receiver circuitry configured to detect nonvisible light emitted by an LED fixture in range of the portable wireless electronic device; demodulation circuitry configured to extract, from the detected nonvisible light, a unique node ID assigned to the LED fixture; network connectivity circuitry configured to interface with a wireless network that includes the LED fixture and a plurality of additional LED fixtures; and software and/or hardware configured to take one or more actions based on the unique node ID extracted from the detected nonvisible light.

According to an embodiment of a method of provisioning LED fixtures in a wireless network, the method comprises: detecting nonvisible light emitted by each of the LED fixtures, using a portable wireless electronic device that comes into proximity of each of the LED fixtures one at a time; extracting, from the detected nonvisible light for each of the LED fixtures, a unique node ID assigned to each of the LED fixtures; and provisioning each of the LED fixtures into the wireless network, based on the unique ID extracted from the detected nonvisible light for each of the LED fixtures.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 4 illustrates a schematic diagram of an embodiment of generating unique IDs for the LED fixtures, for a wireless mesh network.

DETAILED DESCRIPTION

The embodiments described herein provide a method of provisioning LED fixtures in a wireless network and embodiments of the LED fixtures and a portable wireless electronic device used as part of the provisioning method. Provisioning in a wireless network is a process which performs authentication and provides information such as, e.g., unicast addresses, network key, etc. that enables a device to be added to the wireless network. A provisioned node can transmit/receive messages in the wireless network.

The embodiments described herein enable a user or robot to identify and provision any wirelessly connected LED fixture after anonymous/random deployment in a wireless network. Each LED fixture includes modulation circuitry for modulating emitted nonvisible light with a unique node ID assigned to the LED fixture, to broadcast the unique node ID via electromagnetic radiation towards a portable wireless electronic device in range of the modulated nonvisible light. A user or robot equipped with the portable wireless electronic device can provision the LED fixtures, group the LED fixtures, and/or change one or more lighting properties of the LED fixtures, all in the field after anonymous/random deployment, by extracting the unique node IDs from the detected nonvisible light and taking one or more actions based on each unique node ID extracted from the detected nonvisible light.

Described next, with reference to the figures, are exemplary embodiments of the LED fixtures, portable wireless electronic device, and provisioning method.

Figure 1:
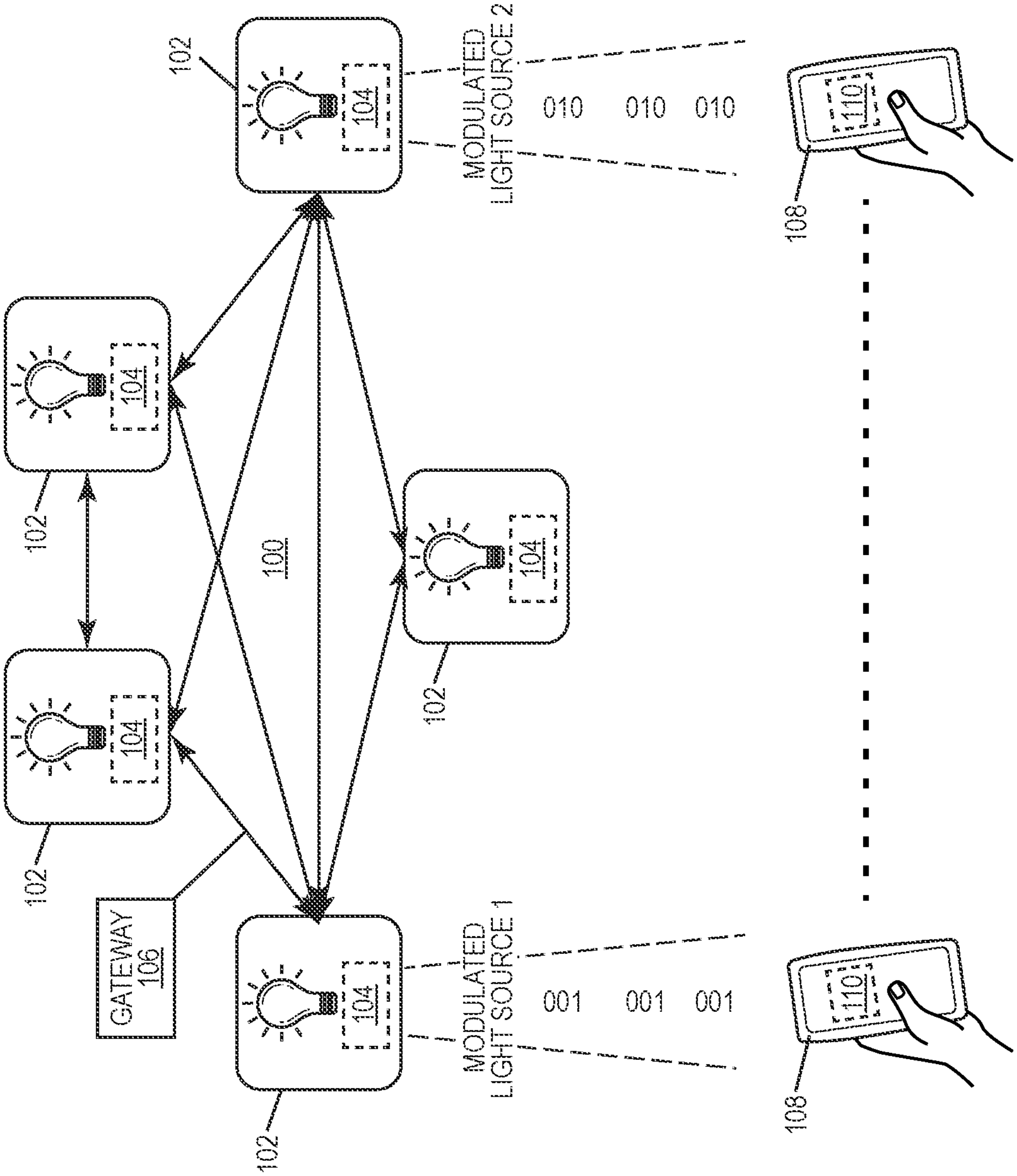
FIG. 1 illustrates a schematic diagram of a wireless network of LED fixtures and a portable wireless electronic device for provisioning the LED fixtures.

FIG. 1 illustrates a wireless network 100 such as a wireless mesh network of LED fixtures 102 such as smart LED tubes, bulbs, etc. Five (5) LED fixtures 102 are shown in FIG. 1 for ease of illustration. In practice, tens, hundreds, thousands, or more LED fixtures 102 may be included in the wireless network 100. Each LED fixture 102 includes circuitry 104 that enables the LED fixture 102 to emit visible light, emit nonvisible light, interface with, e.g., a gateway device 106 such as a router for the wireless network 100, and modulate the nonvisible light with a unique node ID assigned to the LED fixture 102. Two such nonvisible light streams are shown modulated with respective unique node IDs '001' and '010' in FIG. 1, e.g., using on/off keying (OOK) with Manchester coding (e.g., IEEE802.15.7).

When a portable wireless electronic device 108 such as a laptop computer, cell phone, robot, etc. moves in range of the modulated nonvisible light emitted by one of the LED fixtures 102, circuitry 110 included in the portable wireless electronic device 108 detects the nonvisible light, extracts the corresponding unique node ID from the detected nonvisible light, interfaces with the wireless network 100, and takes one or more actions based on the unique node ID extracted from the detected nonvisible light. For example, the nonvisible light emitted by an LED fixture 102 may cover an area of about 3 meters by 3 meters. The portable wireless electronic device 108 detects the nonvisible light when in the area covered by the LED fixture 102.

Figure 2:
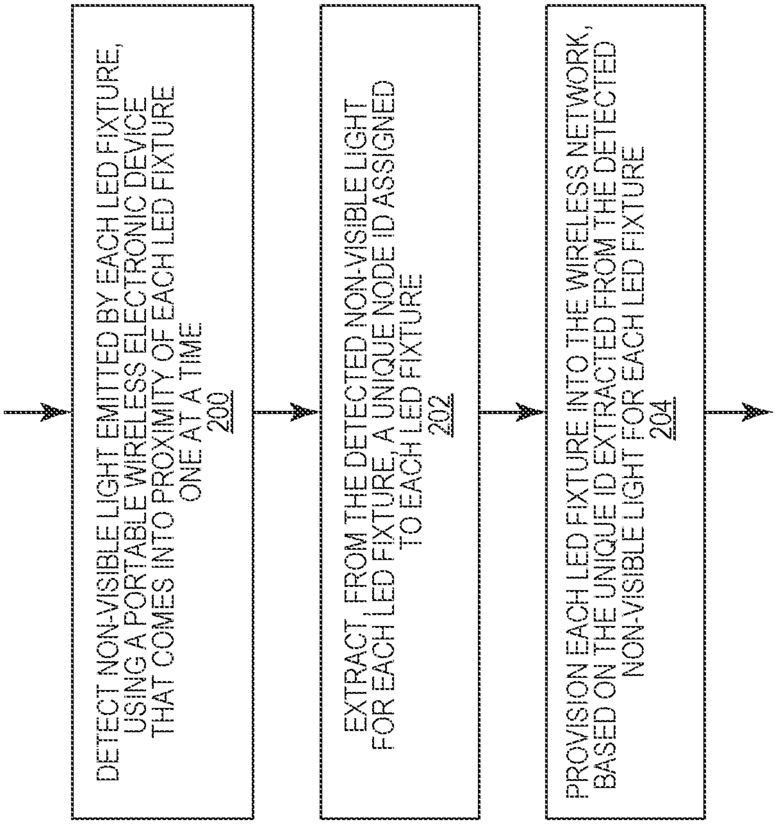
FIG. 2 illustrates a flow diagram of an embodiment of a provisioning method implemented by the portable wireless electronic device.

FIG. 2 illustrates an embodiment of a provisioning method implemented by the portable wireless electronic device 108. The provisioning method includes detecting nonvisible light emitted by each LED fixture 102 included in the wireless network 100, with the portable wireless electronic device 108 coming in range of each LED fixture 102 one at a time as indicated by the dashed horizontal line in FIG. 1 (Block 200). The provisioning method further includes extracting, from the detected nonvisible light for each LED fixture 102, a unique node ID assigned to each LED fixture 102 (Block 202). The provisioning method further includes provisioning each LED fixture 102 into the wireless network 100, based on the unique ID extracted from the detected nonvisible light for each of the LED fixtures 102 (Block 204).

In the case of Bluetooth technology, e.g., Bluetooth Low-Energy (BLE), provisioning through Bluetooth involves adding new LED fixtures 102 to a Bluetooth mesh network. The portable wireless electronic device 108 implements the provisioning process, which involves the portable wireless electronic device 108 and each LED fixture 102 following a fixed procedure which is defined in the Bluetooth mesh specification. The portable wireless electronic device 108 provides each un-provisioned LED fixture 102 with provisioning data that allows it to become a Bluetooth mesh node. The Bluetooth mesh specification defines the provisioning protocol, which defines PDUs (packet data units) used to communicate between the portable wireless electronic device 108 and a new, un-provisioned LED fixture 102 during the provisioning process. More generally, any combination of wireless LED technology and mesh network technology such as BLE mesh, Zigbee, Thread, etc. can be used to provision an LED fixture 102 in a wireless network 100.

Figure 3:
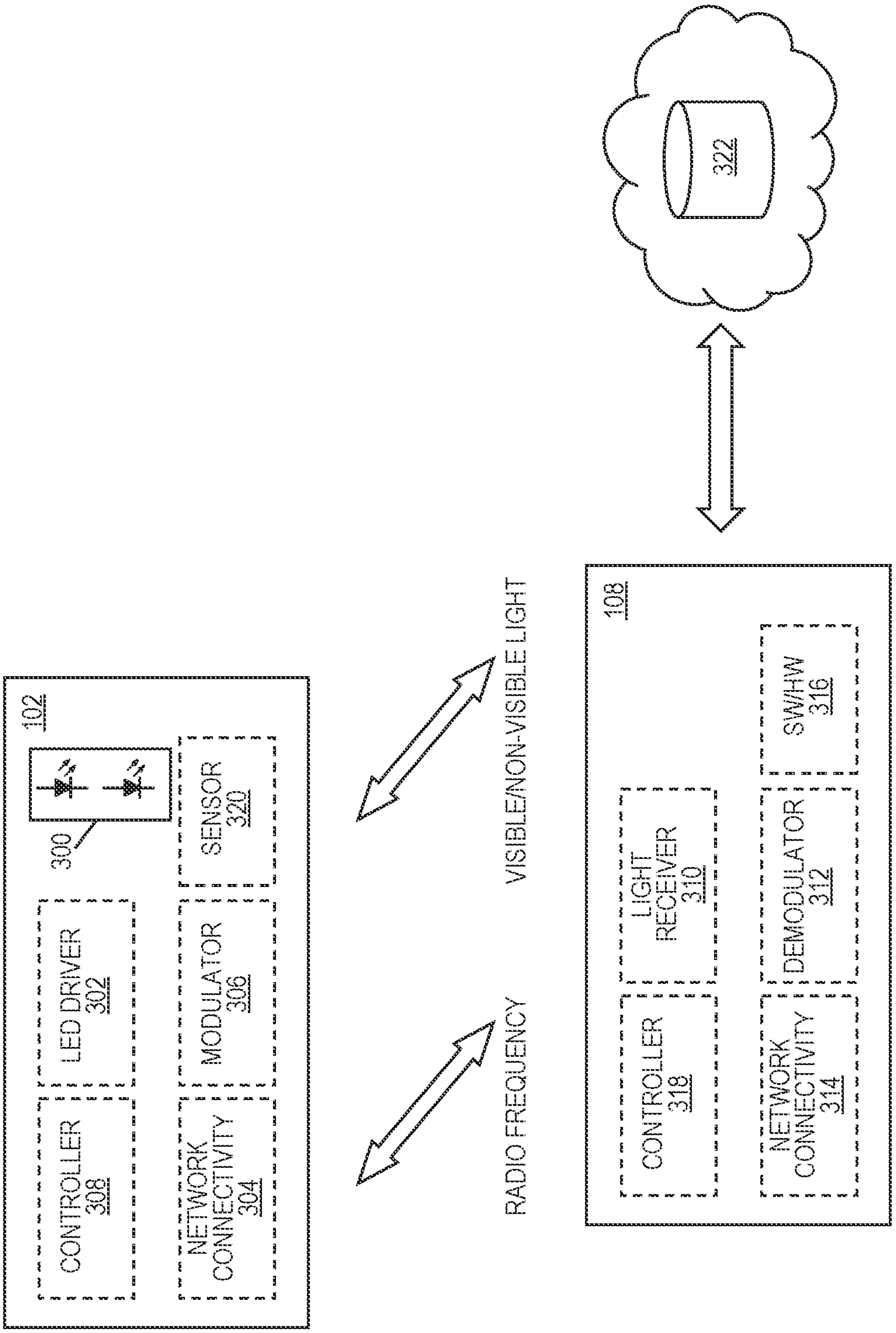
FIG. 3 illustrates an embodiment of the LED fixtures and the portable wireless electronic device.

FIG. 3 illustrates an embodiment of the LED fixtures 102 and the portable wireless electronic device 108. According to this embodiment, the circuitry 104 included in each LED fixture 102 and described above in connection with FIGS. 1 and 2 includes an LED or string of LEDs 300, an LED driver 302 for regulating power to the LED or string of LEDs 300, network connectivity circuitry 304 such as Wi-Fi circuitry for interfacing with the wireless network gateway device 106 and Bluetooth circuitry for adding the LED fixture 102 to a Bluetooth mesh network, and modulation circuitry 306 such as a PWM (pulse width modulator) for modulating nonvisible light emitted by the LED or string of LEDs 300 with a unique node ID assigned to the LED fixture 102, to broadcast the unique node ID via electromagnetic radiation towards the portable wireless electronic device 108 when the portable wireless electronic device 108 is in range of the modulated nonvisible light. The network connectivity circuitry 304 and/or the modulation circuitry 306 may be included in or associated with a controller 308 included in the LED fixture 102.

Further according to the embodiment illustrated in FIG. 3, the circuitry 110 included in the portable wireless electronic device 108 and described above in connection with FIGS. 1 and 2 includes light receiver circuitry 310 such as a solar panel with a DC blocking capacitor, an IR (infrared) receiver, optical camera, etc. can be used as a receiver for detecting nonvisible light emitted by an LED fixture 102 in range of the portable wireless electronic device 108, demodulation circuitry 312 such as a PWM demodulator for extracting, from the detected nonvisible light, a unique node ID assigned to the LED fixture 102, network connectivity circuitry 314 such as Wi-Fi circuitry for interfacing with the wireless network gateway device 106 and Bluetooth circuitry for interfacing with the Bluetooth mesh network, and software (SW) and/or hardware (HW) 316 for taking one or more actions based on the unique node ID extracted from each stream of detected nonvisible light. The demodulation circuitry 312, the network connectivity circuitry 314, and/or the SW/HW 316 may be included in or associated with a controller 318 included in the portable wireless electronic device 108. The portable wireless electronic device 108 and the LED fixture 102 each have both RF and light transmit (TX) or receive (RX) capability, as indicated in FIG. 3.

The modulation circuitry 306 included in each LED fixture 102 may encrypt the unique node ID assigned to the LED fixture 102, before modulating the nonvisible light emitted by the LED or string of LEDs 300 with the unique node ID. In one embodiment, the LED fixture modulation circuitry 306 encrypts the unique node ID assigned to the LED fixture 102 using a key assigned to the wireless network 100.

Separately or in combination, the modulation circuitry 306 included in each LED fixture 102 may receive one or more commands from the wireless network gateway device 106 or from the portable wireless electronic device 108 when the portable wireless electronic device 108 is in range of the modulated nonvisible light emitted by the LED fixture 102. In response to a received command, the LED fixture modulation circuitry 306 may adjust one or more parameters associated with operation of the LED or string of LEDs 300. For example, the LED fixture controller 308 may be configured to adjust a sensitivity level of a sensor 320 included in the LED fixture 102, based on a command received from the portable wireless electronic device 108 in range of the modulated nonvisible light or from the wireless network gateway device 106. Separately or in combination, the LED fixture controller 308 may adjust an intensity and/or color temperature for the LED or string of LEDs 300, based on a command received from the portable wireless electronic device 108 in range of the modulated nonvisible light or from the wireless network gateway device 106.

As explained above, the SW/HW 316 included in the portable wireless electronic device 108 takes one or more actions based on the unique node ID extracted from a stream of detected nonvisible light emitted by an LED fixture 102 in-range of the portable wireless electronic device 108. For example, the SW/HW 316 included in the portable wireless electronic device 108 may adjust a sensitivity level of a sensor 320 included in the LED fixture 102, based on the unique ID extracted from the detected nonvisible light.

Separately or in combination, the SW/HW 316 included in the portable wireless electronic device 108 may adjust an intensity and/or color temperature for the LED fixture 102, based on the unique ID extracted from the detected nonvisible light.

Separately or in combination, the SW/HW 316 included in the portable wireless electronic device 108 may cause a firmware update at the LED fixture 102, based on the unique ID extracted from the detected nonvisible light.

Separately or in combination, the SW/HW 316 included in the portable wireless electronic device 108 may group the LED fixture 102 with one or more additional LED fixtures 102 in the wireless network 100, based on the unique ID extracted from the detected nonvisible light.

Separately or in combination, the SW/HW 316 included in the portable wireless electronic device 108 may provision the LED fixture 102 into the wireless network 100, based on the unique ID extracted from the detected nonvisible light.

Separately or in combination, the SW/HW 316 included in the portable wireless electronic device 108 may upload data on each unique ID extracted from detected nonvisible light for each LED fixture 102 in the wireless network 100. For example, as shown in FIG. 3, the SW/HW 316 included in the portable wireless electronic device 108 may upload data extracted LED fixture ID information to a cloud-based database resource 322 via a local database exchange process such as MQTT (MQ Telemetry Transport) which is a publish-subscribe, machine-to-machine network protocol.

Separately or in combination, the unique ID extracted from each stream of detected nonvisible light is encrypted using a key assigned to the wireless network 100, e.g., as described above. The SW/HW 316 included in the portable wireless electronic device 108 may have a decryption engine that decrypts the unique node ID extracted from a detected stream of nonvisible light using the key assigned to the wireless network 100.

As explained above, the wireless network 100 may be a wireless mesh network such as a BLE mesh network, Zigbee mesh network, Thread mesh network, etc. In the case of a wireless mesh network, the SW/HW 316 included in the portable wireless electronic device 108 may provision the LED fixture 102 into a mesh group of the wireless network 100, based on the unique ID extracted from the detected nonvisible light.

FIG. 4 illustrates an embodiment of generating the unique IDs for the LED fixtures 102, for a wireless mesh network. According to this embodiment, the unique node ID assigned to each LED fixture 102 prior to provisioning is recoded for communication via nonvisible light to the portable wireless electronic device 108 which recovers the unique node IDs and provides the recovered IDs to the wireless network 100. BLE is used as the wireless mesh network technology for the following embodiment of assigning and recoding a unique node ID for an LED fixture 102. FIG. 4 shows the assigned mesh node ID before provisioning and the recoded mesh node ID after provisioning.

In a BLE-based mesh network, each non-provisioned BLE device is assigned a mesh node UUID (universally unique identifier) 400 which is a unique 'name' for the non-provisioned BLE device. The mesh network is assigned a mesh network UUID 402 which can have multiple domains (e.g., New York, California, etc.) and identifies which mesh network the non-provisioned BLE device is associated. Each non-provisioned BLE device also is assigned a mesh node unicast address 404 which identifies a source/destination of unicast messages.

The node ID 406 assigned to the LED fixture 102 prior to provisioning may include part of the mesh node UUID and/or part of the mesh network UUID. For example, in FIG. 4, the unique node ID assigned to the LED fixture 102 prior to provisioning includes the values '57' and 'D7' from the mesh node UUID. After provisioning, which means the LED fixture 102 is paired with the wireless network 100, the unique node ID 408 assigned to the LED fixture 102 may be include part of the mesh node ID assigned to the LED fixture 102 and/or part of the network ID assigned to the wireless mesh network 100 and/or part or all of the unicast address assigned to the LED fixture 102. For example, in FIG. 4, the recoded unique node ID assigned to the LED fixture 102 includes the values '7A' and 'A0' from the network ID assigned to the wireless mesh network 100 and the unicast address value '0002' assigned to the LED fixture 102. The LED fixture 102 modulates a nonvisible light signal with the recoded ID 'VLC7AA00002' in FIG. 4, so the LED fixture 102 can be identified in the wireless network 100.

In one embodiment, the wireless network 100 has more than one mesh group. According to this embodiment, the SW/HW 316 included in the portable wireless electronic device 108 provisions a first subset of the LED fixtures 102 into a first mesh group of the wireless network 100, based on the unique ID extracted from the detected nonvisible light for the first subset of the LED fixtures 102. The SW/HW 316 included in the portable wireless electronic device 108 provisions a second subset of the LED fixtures 102 into a second mesh group of the wireless network 100, based on the unique ID extracted from the detected nonvisible light for the second subset of the LED fixtures 102.

Figure 5:
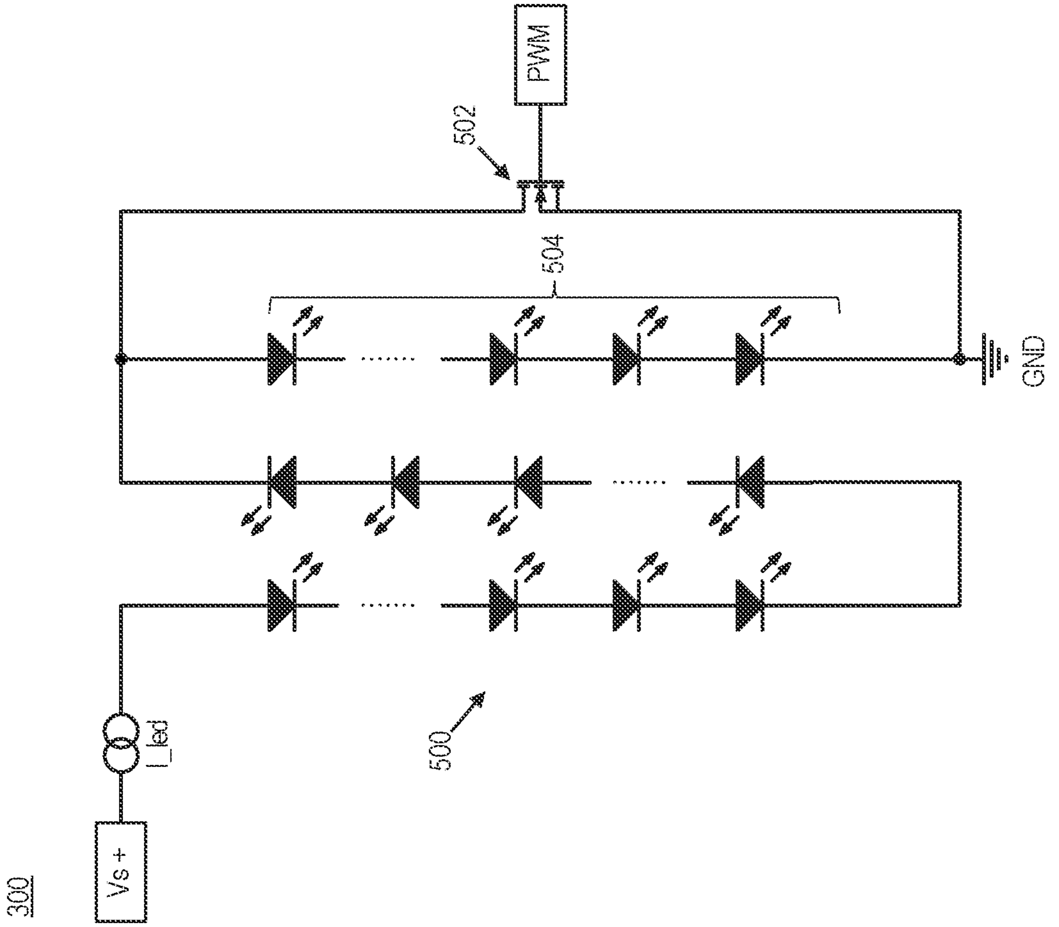
FIG. 5 illustrates a schematic diagram of an embodiment of an LED or string of LEDs included in each LED fixture and used to communicate unique node IDs assigned to the LED fixtures.

FIG. 5 illustrates an embodiment of the LED or string of LEDs 300 included in each LED fixture 102 and used to communicate the unique node IDs assigned to the LED fixtures 102. According to this embodiment, the LED modulation is implemented directly in the LED fixture 102. In FIG. 5, a constant current source 'I_led' provides, during normal lighting operation, a constant current from a voltage source 'Vs' to a string of LEDs 500 electrically connected in series. The LED driver 302 regulates power to the string of LEDs 500 in a constant current (CC) mode. The modulation circuitry 306 included in each LED fixture 102 includes a switch device 502 such as an n-channel power MOSFET (metal-oxide-semiconductor field-effect transistor) coupled in parallel with a subset 504 of LEDs included in the string of LEDs between a drain 'D' and a source 'S' of the switch device 502. The modulation circuitry 306 included in each LED fixture 102 modulates nonvisible light emitted by the subset 504 of LEDs by controlling the gate 'G' of the switch device 502 based on the unique node ID assigned to the LED fixture 102. With this approach, the entire string of LEDs 500 is not modulated but instead only a subset 504 of LEDs is completely turned on and off to implement the LED modulation.

Figure 6:
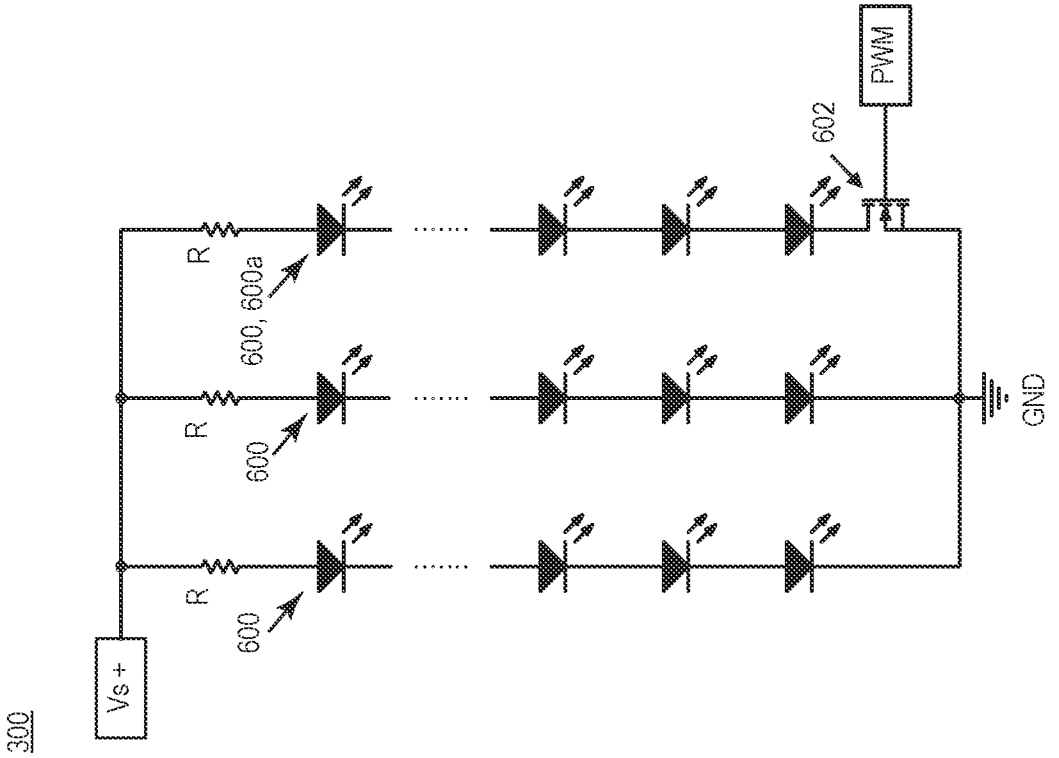
FIG. 6 illustrates a schematic diagram of another embodiment of an LED or string of LEDs included in each LED fixture and used to communicate unique node IDs assigned to the LED fixtures.

FIG. 6 illustrates another embodiment of the LED or string of LEDs 300 included in each LED fixture 102 and used to communicate the unique node IDs assigned to the LED fixtures 102. Like FIG. 5, the LED modulation is implemented directly in the LED fixture 102. In FIG. 6, a resistor R limits current from a constant voltage source 'Vs' to each string 660 of LEDs which are electrically connected in parallel. The LED driver 302 regulates power to the plurality of strings 600 of LEDs in a constant voltage (CV) mode. The modulation circuitry 306 included in each LED fixture 102 includes a switch device 602 such as an n-channel power MOSFET coupled in series with one string 600*a* of the LEDs between a drain 'D' and a source 'S' of the switch device 602. The modulation circuitry 306 included in each LED fixture 102 modulates nonvisible light emitted by the string 600*a* of LEDs in series with the switch device 602, by controlling the gate 'G' of the switch device 602 based on the unique node ID assigned to the LED fixture 102. With this approach, the entire set of LEDs 600 is not modulated but instead only a subset 600*a* of LEDs is completely turned on and off to implement the LED modulation.

In both FIGS. 5 and 6, modulation depth is controlled by a portion 504/600*a* of the active LEDs 500/600 under control by a switch device 502/602 in either CC or CV mode operation. The nonvisible light is modulated by the LED driver 302 of the switch device 502/602. The effective lumen can be better compensated this way. However, the signal-to-noise (SNR) ratio from the perspective of the portable wireless electronic device 108 will be higher with non-zero modulation depth. The interconnection of the LEDs 500/600 may be adjusted to reduce the SNR at the portable wireless electronic device 108.

Figure 7:
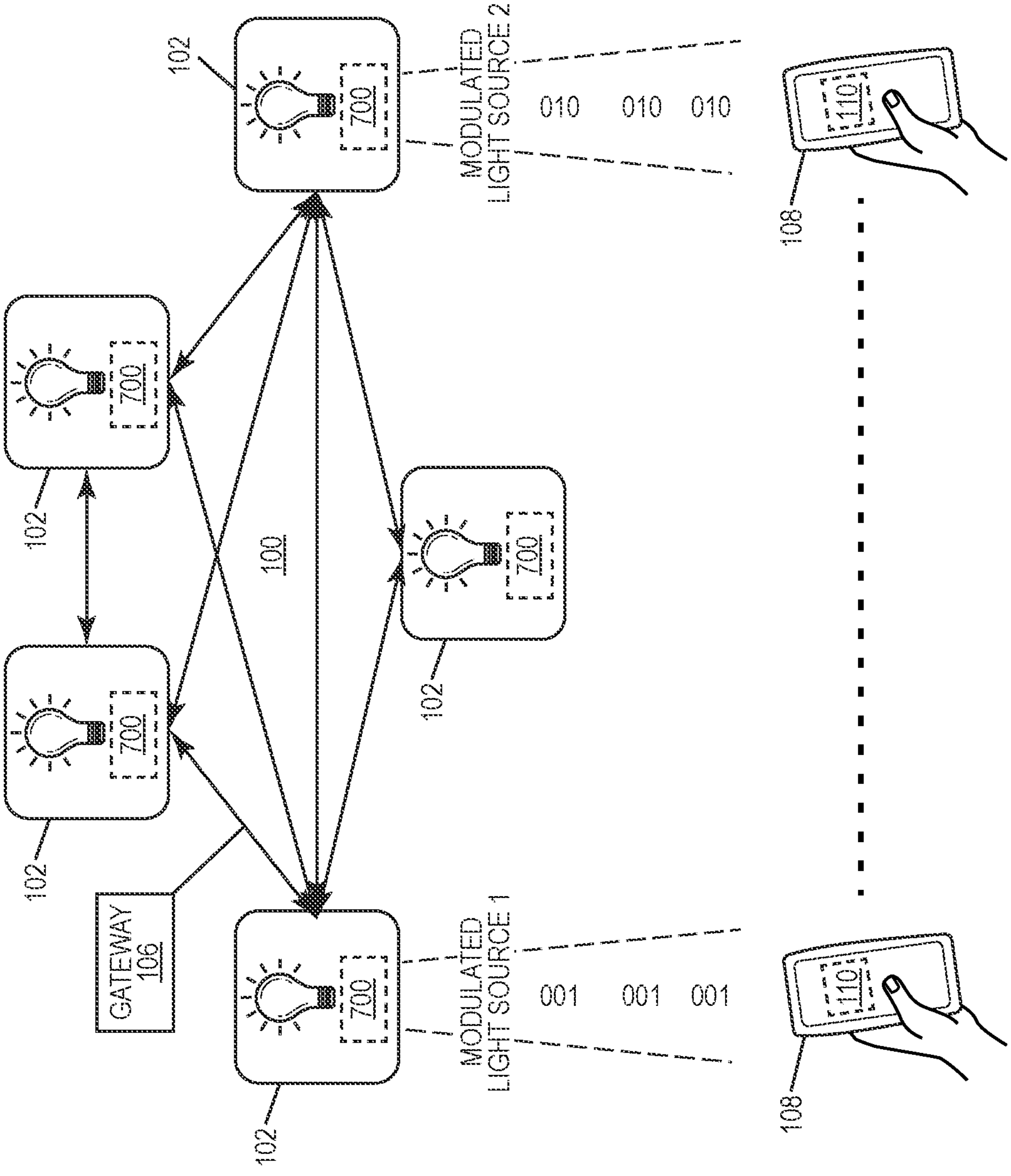
FIG. 7 illustrates a schematic diagram of an embodiment of the portable wireless electronic device adjusting the sensitivity level of a radar motion sensor included in LED fixtures that come in-range of the portable wireless electronic device.

As shown in FIG. 3, each LED fixture 102 may include one or more sensors 320. FIG. 7 illustrates an embodiment according to which one of the sensors 320 included in the LED fixtures 102 is a radar motion sensor 700. An action taken by the portable wireless electronic device 108 based on a unique node ID extracted from detected nonvisible light emitted by an in-range LED fixture 102 may be to adjust the sensitivity level of the radar motion sensor 700 included in the LED fixture 102, e.g., if the radar motion sensor 700 is overly sensitive in a corridor.

Figure 8:
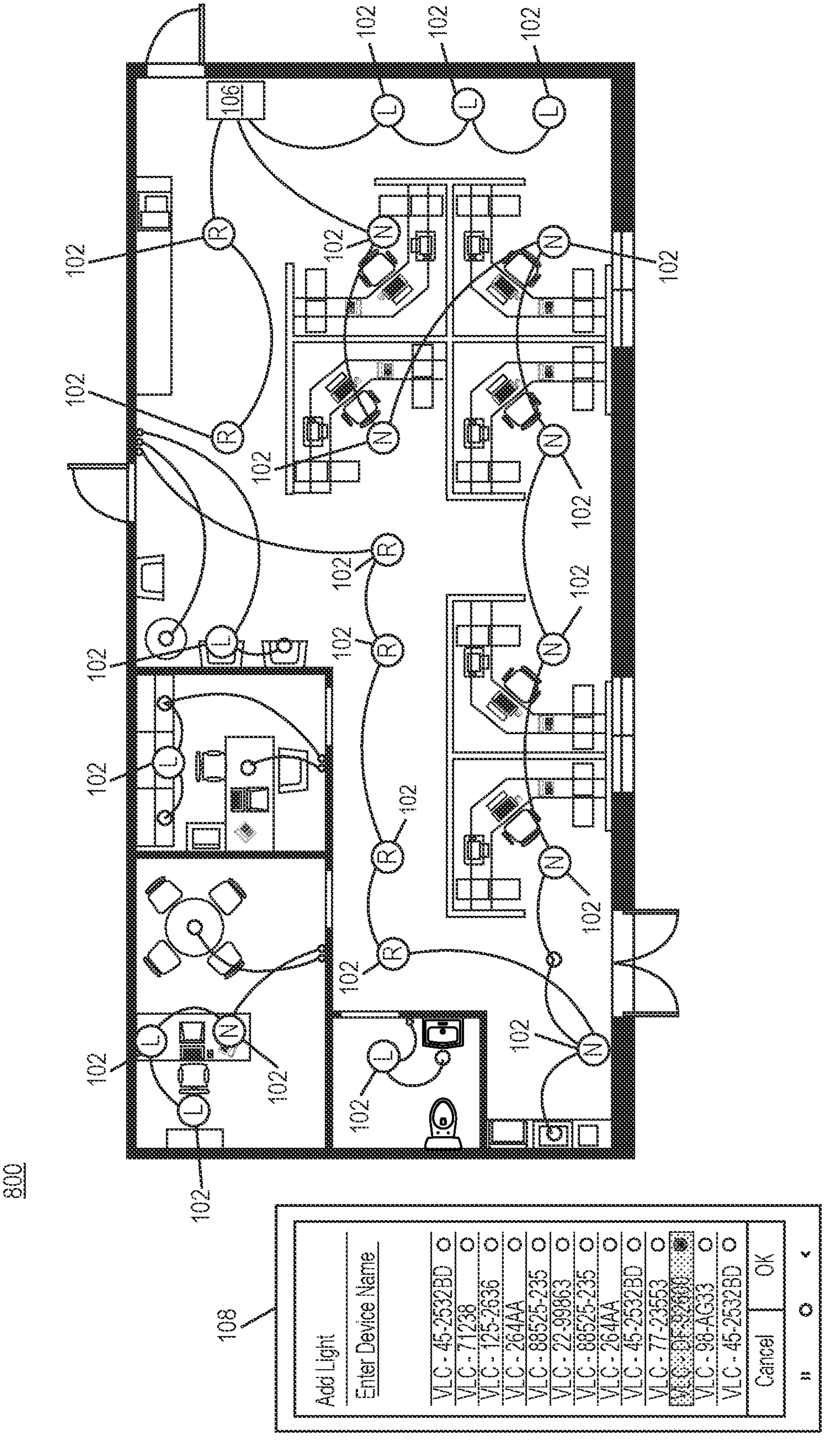
FIG. 8 illustrates a schematic diagram of another embodiment of one or more actions taken by the portable wireless electronic device based on unique node IDs extracted from detected nonvisible light emitted by LED fixtures that come in-range of the portable wireless electronic device.

FIG. 8 illustrates another embodiment of one or more actions taken by the portable wireless electronic device 108 based on unique node IDs extracted from detected nonvisible light emitted by LED fixtures 102 that come in-range of the portable wireless electronic device 108. FIG. 8 shows an example of an LED lighting layout for an office suite 800 or other type of large space such as a warehouse, shopping center, factory, school, hospital, etc.

After the portable wireless electronic device 108 recovers the unique node IDs for the LED fixtures 102 as previously described herein, the portable wireless electronic device 108 may zone or group the LED fixtures 102 as desired, e.g., by space type, space configuration, space usage, etc. Separately or in combination, the portable wireless electronic device 108 may revise feature and node type ('L', 'N', 'R') of each LED fixture 102 within the wireless network 100, e.g., to establish a backbone of the mesh lighting network. For example, some LED fixtures 102 may be enabled in full power mode and other LED fixtures may be enabled in low power mode. FIG. 8 shows the portable wireless electronic device 108 identifying several LED fixtures 102 by unique node ID, for selecting the desired LED fixture(s) 102 and taking one or more of the actions described herein (e.g., provisioning, grouping/zoning, sensor adjustment, color adjustment, power adjustment, etc.). The portable wireless electronic device 108 may take other actions, such as directly instructing an in-range LED fixture 102 to change node type which saves network resources. For example, in the case of BLE as the network technology, the portable wireless electronic device 108 may directly instruct an in-range LED fixture 102 to change from one BLE node type to another, e.g., such as relay node, low power node (LPN), friend node, etc.

FIGS. 9 through 12 illustrate different embodiments of the modulation circuitry 306 included in each LED fixture 102.

Figure 9:
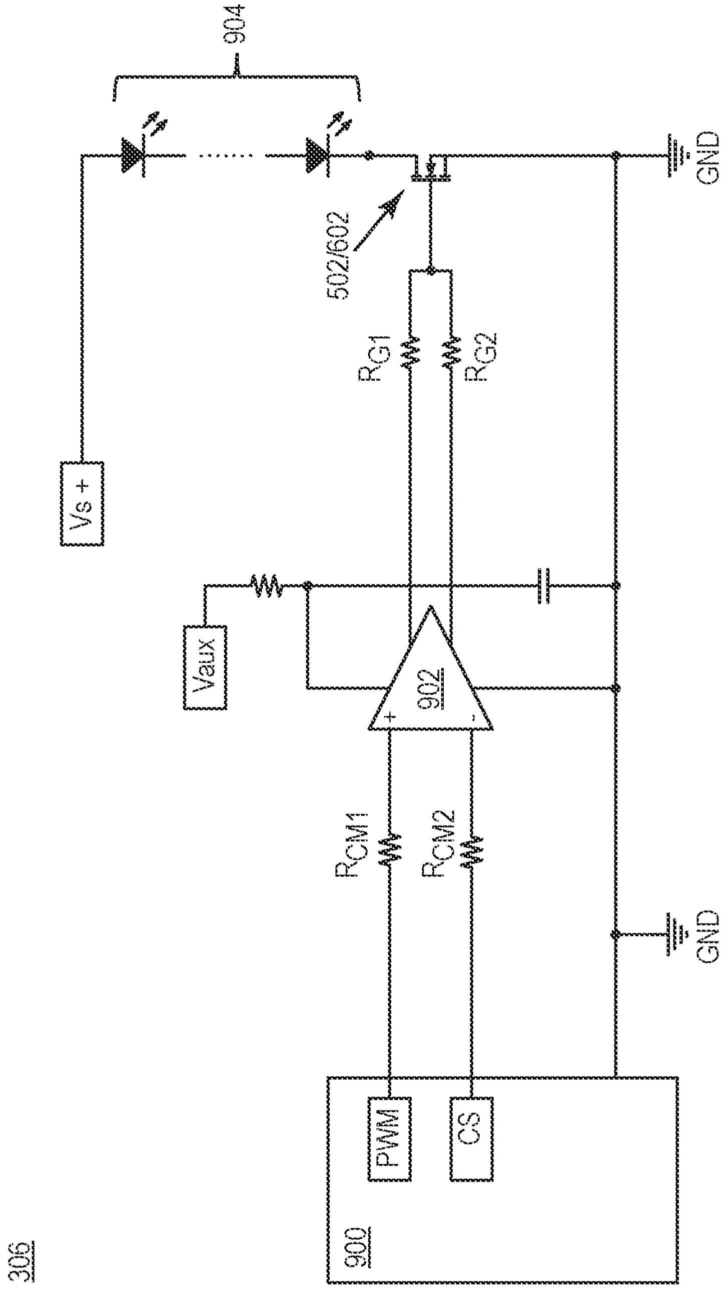
FIGS. 9 through 12 illustrate schematic diagrams of different embodiments of modulation circuitry included in each LED fixture.

In FIG. 9, the modulation circuitry 306 includes a PWM light modulation driver 900 that modulates nonvisible light emitted by the LED or string of LEDs 300 of an LED fixture 102 beyond a cutoff frequency of a response loop of the LED driver 302, where the cutoff frequency of the response loop of the LED driver 302 is below 10 kHz. For example, the PWM light modulation may be implemented at a frequency that is 5× to 10× higher than the cutoff frequency of the response loop of the LED driver 302. The PWM light modulation driver 900 outputs a differential pair signal 'PWM, CS' which is input to a differential amplifier 902 via respective resistors $R_{CM1}$, $R_{CM2}$, to avoid a common ground issue when using an auxiliary power source A/aux' to bias the differential amplifier 902. The output of the differential amplifier 902 is input to a gate of the switch device 502/602 of the modulation circuitry 306 via respective resistors $R_{G1}$, $R_{G2}$. The switch device 502/602 which may be operated in CC or CV mode to control the current in an LED or string of LEDs 904, as previously explained herein. The source side inductance of the switch device 502/602 may cause disturbance on the signal ground. In this case, the PWM light modulation driver 900 may drive the differential amplifier 902 while minimizing the disturbance from the signal ground. For high frequency switching, the turn off loss may be severe when the LED current increases which reduces the effective duty cycle for the LED fixture 102. Compensation such as higher DC current may be used to maintain similar lumen output.

Figure 10:
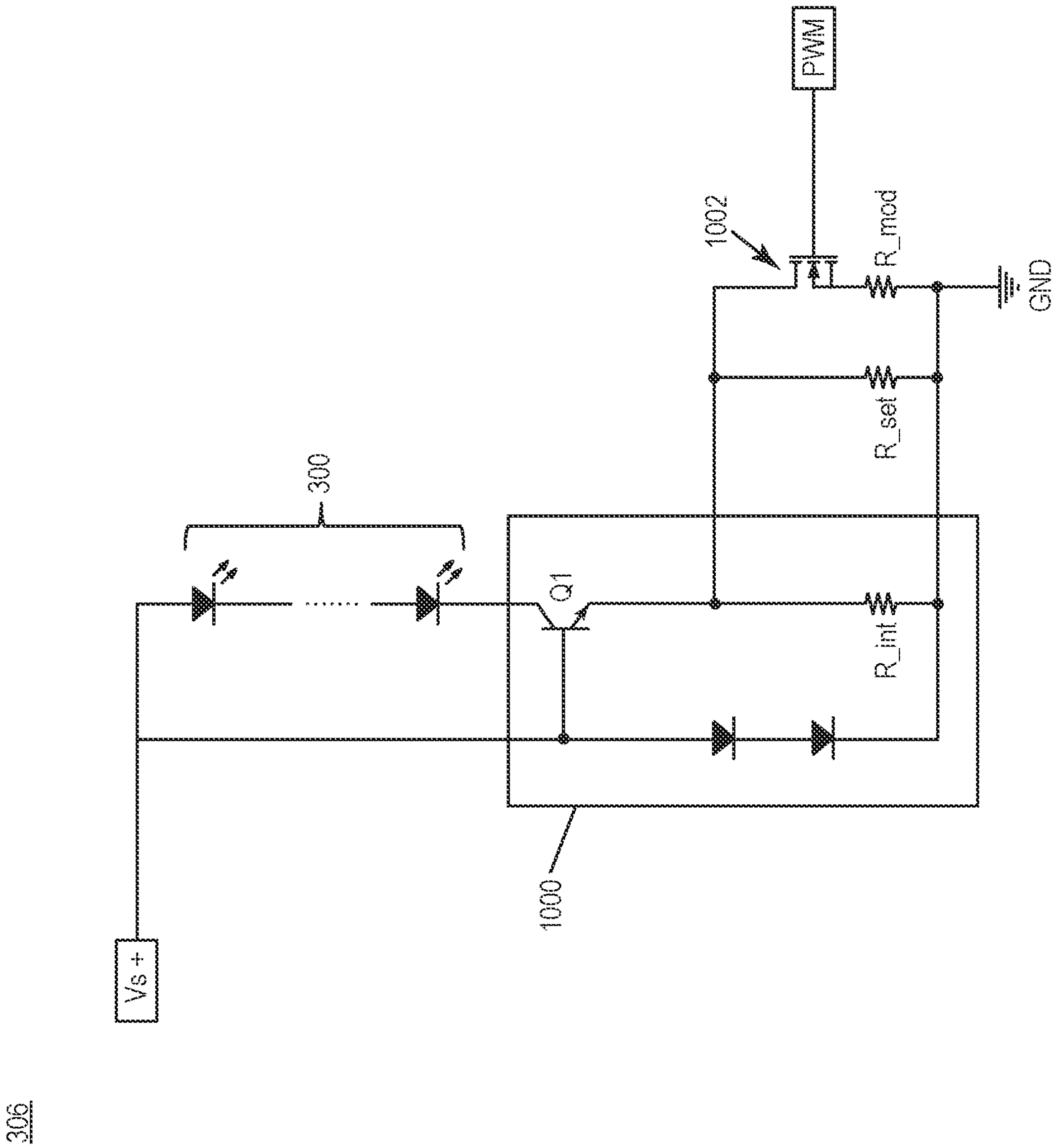

In FIG. 10, a voltage mode control linear LED driver 1000 is used. The linear LED driver 1000 regulates the peak current of the LED current and modulates the desire light modulation signal. A resistor Rext may be used to set the DC current. An internal resistor R_int sets the LED current through LED driver transistor Q1 during normal lighting operation. A second resistor R set, which may be integrated within the LED driver 1000 or may be a discrete (external) component, is in parallel with the internal resistor R_int. A switch device 1002 such as an n-channel power MOSFET may be used to implement the LED light modulation, which effectively improves the lumen loss due to lower duty cycle as a result of light modulation. A resistor R mod connected between the source of the switch device 1002 and reference ground GND sets the LED current during modulation.

Figure 11:
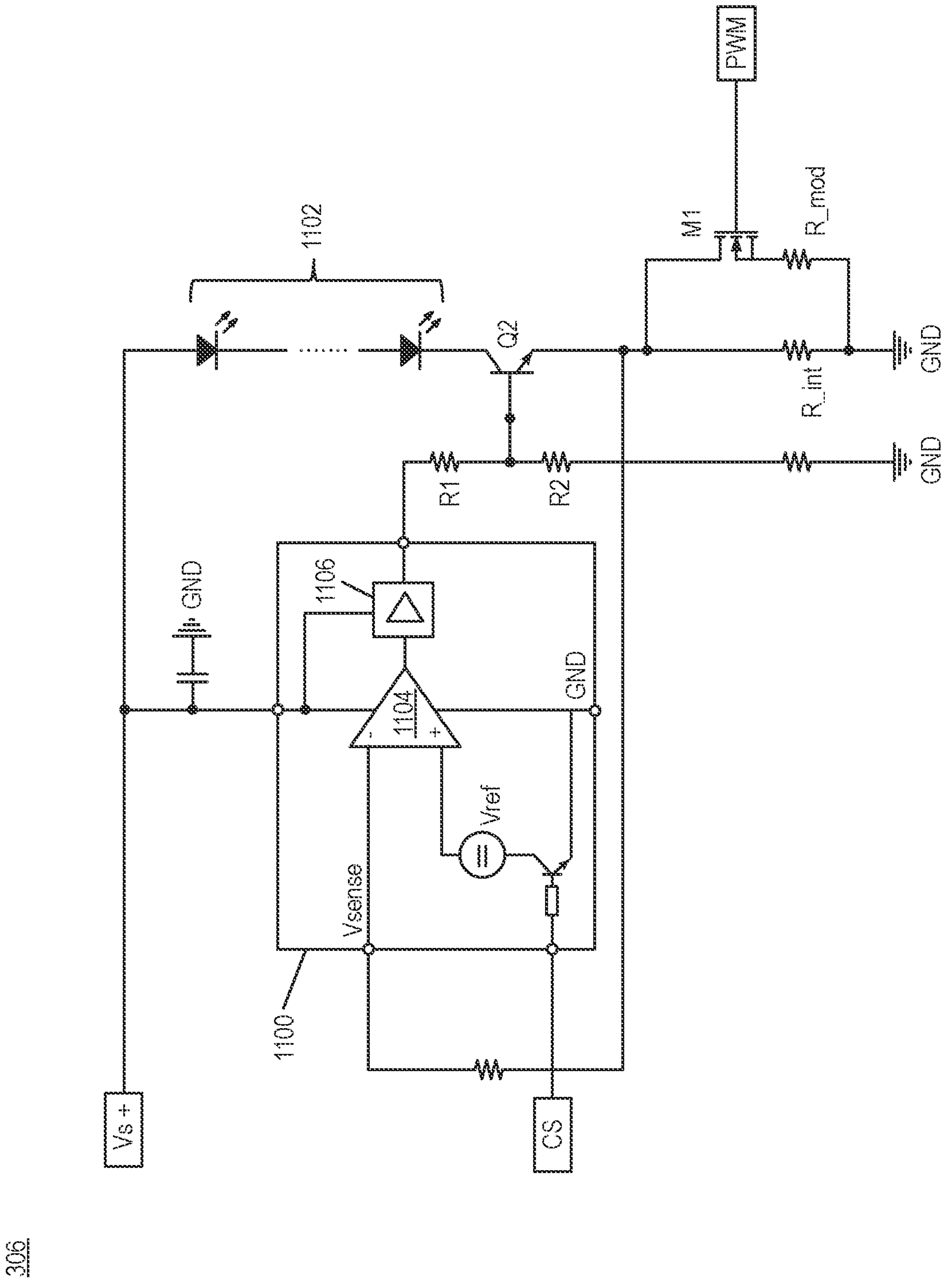

In FIG. 11, an LED driver 1100 powered by a constant voltage source Vs modulates the base current of a main bipolar junction transistor Q2 to regulate the power to an LED or string of LEDs 1102. A control signal 'CS' sets a reference voltage 'Vref' input to a differential amplifier 1104 of the LED driver 1100 via a bipolar junction transistor Q3. A bias current is fed back to the LED driver 1100 from two resistors R1, R2 in the form of a voltage 'Vsense' which is the other input to the differential amplifier 1104. A gate driver 1106 provides the base current to the main bipolar junction transistor Q2, based on the output of the differential amplifier 1104. The current through the LED or string of LEDs 1102 is set by an internal resistor R_int during normal LED lighting operation. A second resistor R mod provides modulated current to enable LED light modulation. A MOSFET M1 and the second resistor R mod form a network to modulate the LED current. The PWM input to the MOSFET M1 determines the degree of LED light modulation. The base current for the main bipolar junction transistor Q2 does not need to be zero during LED light modulation. For example, the base current for the main bipolar junction transistor Q2 may be in a range of up to 30%, up to 50%, or up to 100% of the modulation current.

Figure 12:
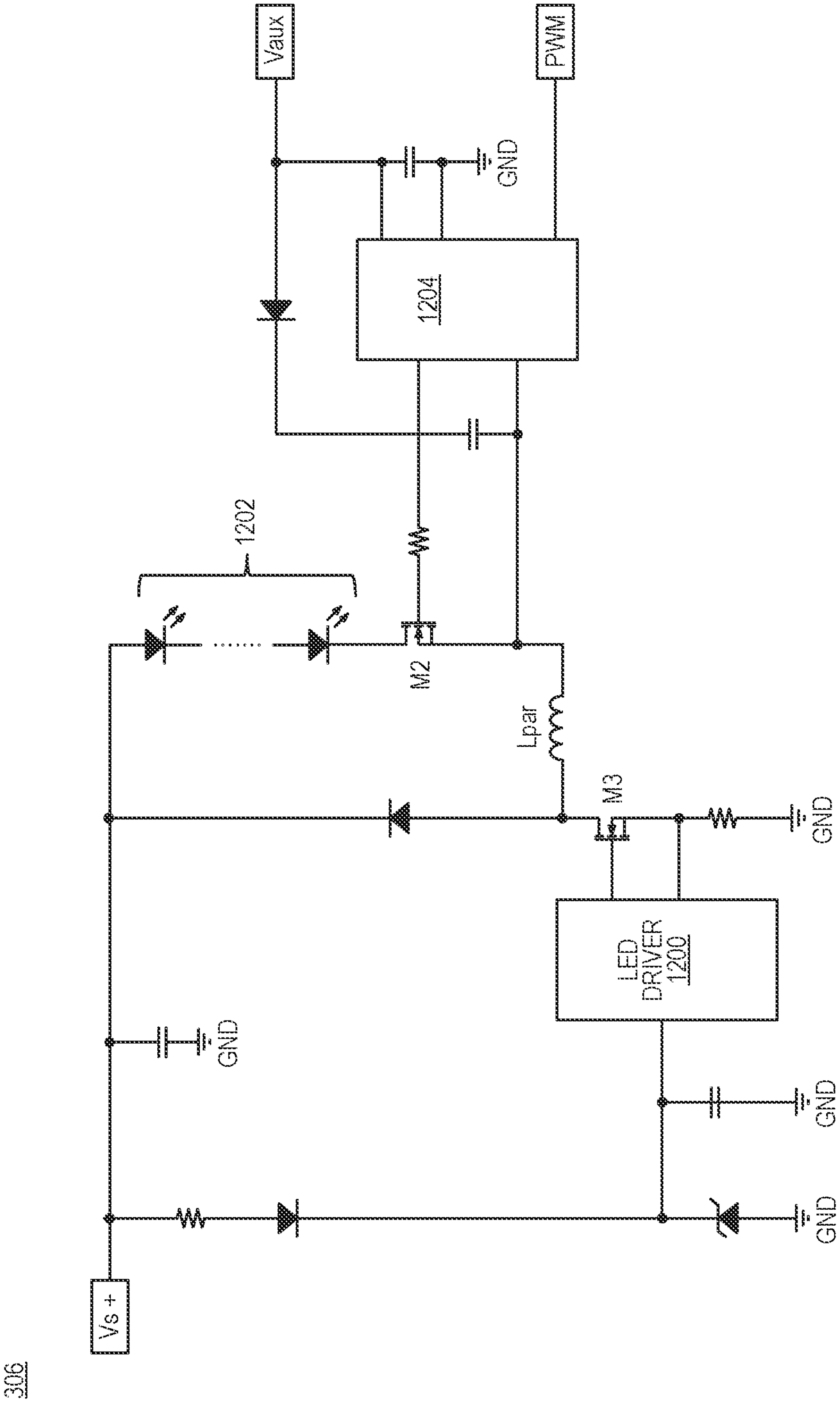

In FIG. 12, an LED driver 1200 is electrically connected to a high-side MOSFET M2. An LED or string of LEDs 1202 is electrically connected between a voltage source Vs and the drain of the high-side MOSFET M2. The source of the high-side MOSFET M2 is electrically connected to the drain of another MOSFET M3 which has a source electrically connected to a ground reference GND. The electrical connection between the source of high-side MOSFET M2 and the drain of MOSFET M3 has parasitic inductance which is represented as an inductor Lpar in FIG. 12. The main LED driver 1200 cannot effectively modulate LED or the string of LEDs 1202 because of the high-side configuration, since the LED or string of LEDs 1202 does not have a direct reference to ground. According to this embodiment, the modulation circuitry 306 includes a second driver or a discrete device 1204 such as a level shifter that provides a reference ground during LED light modulation.

Figure 13:
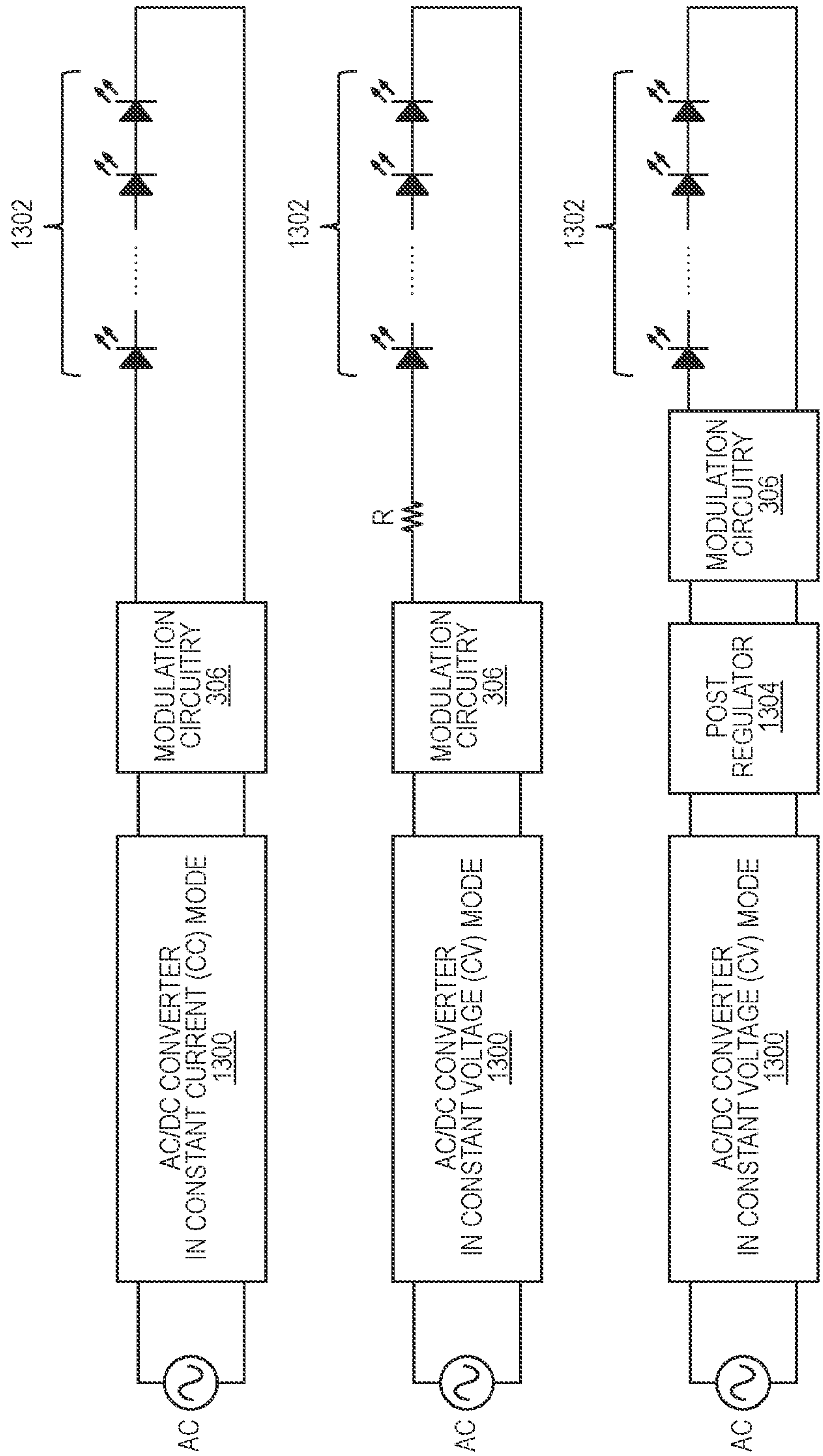
FIG. 13 illustrates schematic diagrams of different placement options for the light modulation circuitry included in the LED fixtures.

FIG. 13 illustrates different placement options for the modulation circuitry 306. In the uppermost example, an AC/DC converter 1300 operating in constant current mode converts an AC input voltage to a constant current for driving an LED or string of LEDs 1302. The modulation circuitry 306 is positioned between the output of the AC/DC converter 1300 operating in constant current mode and the LED or string of LEDs 1302. In the middle example, the AC/DC converter 1300 operates in constant voltage mode and at least one resistor R converts the constant voltage output of the AC/DC converter 1300 to a current for powering the LED or string of LEDs 1302. The modulation circuitry 306 is positioned between the output of the AC/DC converter 1300 operating in constant voltage mode and the LED or string of LEDs 1302. The bottom example is similar to the middle example, but with a post regulator 1304 at the output of the AC/DC converter 1300. The post regulator 1304 may convert the constant voltage output of the AC/DC converter 1300 to a constant current or perform some other form of power control for the LED or string of LEDs 1302.

Although the present disclosure is not so limited, the following numbered examples demonstrate one or more aspects of the disclosure.

Example 1. An LED fixture, comprising: an LED or string of LEDs; an LED driver configured to regulate power to the LED or string of LEDs; network connectivity circuitry configured to interface with a wireless network of LED fixtures; and modulation circuitry configured to modulate nonvisible light emitted by the LED or string of LEDs with a unique node ID assigned to the LED fixture, to broadcast the unique node ID via electromagnetic radiation towards a portable wireless electronic device in range of the modulated nonvisible light.

Example 2. The LED fixture of example 1, wherein the modulation circuitry comprises a light modulation driver configured to modulate the nonvisible light emitted by the LED or string of LEDs beyond a cutoff frequency of a response loop of the LED driver, and wherein the cutoff frequency of the response loop of the LED driver is below 10 kHz.

Example 3. The LED fixture of example 1 or 2, wherein the wireless network is a wireless mesh network, and wherein the unique node ID assigned to the LED fixture comprises part of a mesh node ID assigned to the LED fixture for the wireless mesh network and/or part of a network ID assigned to the wireless mesh network and/or part or all of a unicast address assigned to the LED fixture for the wireless mesh network.

Example 4. The LED fixture of any of examples 1 through 3, wherein the modulation circuitry is configured to encrypt the unique node ID assigned to the LED fixture before modulating the nonvisible light emitted by the LED or string of LEDs with the unique node ID.

Example 5. The LED fixture of example 4, wherein the modulation circuitry is configured to encrypt the unique node ID assigned to the LED fixture using a key assigned to the wireless network.

Example 6. The LED fixture of any of examples 1 through 5, wherein responsive to the broadcast of the unique ID, the modulation circuitry is configured to receive one or more commands from the portable wireless electronic device or via the wireless network of LED fixtures and adjust one or more parameters associated with operation of the LED or string of LEDs based on the one or more commands.

Example 7. The LED fixture of example 6, further comprising a controller configured to adjust a sensitivity level of a sensor included in the LED fixture, based on at least one of the one or more commands.

Example 8. The LED fixture of example 6, further comprising a controller configured to adjust an intensity and/or color temperature for the LED or string of LEDs, based on at least one of the one or more commands.

Example 9. The LED fixture of any of examples 1 through 8, wherein the LED or string of LEDs is a string of LEDs electrically connected in series, wherein the LED driver is configured to regulate power to the string of LEDs in a constant current mode, wherein the modulation circuitry comprises a switch device coupled in parallel with a subset of LEDs included in the string of LEDs, and wherein the modulation circuitry is configured to modulate nonvisible light emitted by the subset of LEDs by controlling a gate of the switch device based on the unique node ID assigned to the LED fixture.

Example 10. The LED fixture of any of examples 1 through 8, wherein the LED or string of LEDs is a plurality of strings of LEDs electrically connected in parallel, wherein the LED driver is configured to regulate power to the plurality of strings of LEDs in a constant voltage mode, wherein the modulation circuitry comprises a switch device coupled in series with one of the strings of LEDs, and wherein the modulation circuitry is configured to modulate nonvisible light emitted by the string of LEDs in series with the switch device by controlling a gate of the switch device based on the unique node ID assigned to the LED fixture.

Example 11. A portable wireless electronic device, comprising: light receiver circuitry configured to detect nonvisible light; demodulation circuitry configured to extract, from the detected nonvisible light, a unique node ID assigned to an LED fixture; network connectivity circuitry configured to interface with a wireless network that includes the LED fixture and a plurality of additional LED fixtures; and software and/or hardware configured to take one or more actions based on the unique node ID extracted from the detected nonvisible light.

Example 12. The portable wireless electronic device of example 11, wherein the software and/or hardware is configured to provision the LED fixture into the wireless network, based on the unique ID extracted from the detected nonvisible light.

Example 13. The portable wireless electronic device of example 11 or 12, wherein the wireless network is a wireless mesh network, and wherein the software and/or hardware is configured to provision the LED fixture into a mesh group of the wireless network, based on the unique ID extracted from the detected nonvisible light.

Example 14. The portable wireless electronic device of any of examples 11 through 13, wherein the software and/or hardware is configured to generate a command configured to adjust a sensitivity level of a sensor included in the LED fixture, based on the unique ID extracted from the detected nonvisible light.

Example 15. The portable wireless electronic device of any of examples 11 through 14, wherein the software and/or hardware is configured to generate a command configured to adjust an intensity and/or color temperature for the LED fixture, based on the unique ID extracted from the detected nonvisible light.

Example 16. The portable wireless electronic device of any of examples 11 through 15, wherein the software and/or hardware is configured to group the LED fixture with one or more of the additional LED fixtures in the wireless network, based on the unique ID extracted from the detected nonvisible light.

Example 17. The portable wireless electronic device of any of examples 11 through 16, wherein the software and/or hardware is configured to upload data on each unique ID extracted from detected nonvisible light for each LED fixture in the wireless network.

Example 18. The portable wireless electronic device of any of examples 11 through 17, wherein the unique ID extracted from the detected nonvisible light is encrypted using a key assigned to the wireless network, and wherein the software and/or hardware is configured to decrypt the unique node ID extracted from detected nonvisible light using the key assigned to the wireless network.

Example 19. A method of provisioning LED fixtures in a wireless network, comprising: detecting nonvisible light emitted by each of the LED fixtures, using a portable wireless electronic device that comes into range of each of the LED fixtures one at a time; extracting, from the detected nonvisible light for each of the LED fixtures, a unique node ID assigned to each of the LED fixtures; and provisioning each of the LED fixtures into the wireless network, based on the unique ID extracted from the detected nonvisible light for each of the LED fixtures.

Example 20. The method of example 20, wherein the wireless network is a wireless mesh network, and wherein provisioning each of the LED fixtures into the wireless network based on the unique ID extracted from the detected nonvisible light for each of the LED fixtures comprises: provisioning a first subset of the LED fixtures into a first mesh group of the wireless network, based on the unique ID extracted from the detected nonvisible light for the first subset of the LED fixtures; and provisioning a second subset of the LED fixtures into a second mesh group of the wireless network, based on the unique ID extracted from the detected nonvisible light for the second subset of the LED fixtures.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An LED fixture, comprising:

a string of LEDs electrically connected in series;

an LED driver configured to regulate power to the string of LEDs in a constant current mode;

network connectivity circuitry configured to interface with a wireless network of LED fixtures; and modulation circuitry configured to modulate nonvisible light emitted by a subset of LEDs included in the string of LEDs with a unique node ID assigned to the LED fixture, to broadcast the unique node ID via electromagnetic radiation towards a portable wireless electronic device in range of the modulated nonvisible light, wherein the modulation circuitry comprises a switch device coupled in parallel with the subset of LEDs, wherein the modulation circuitry is configured to control a gate of the switch device based on the unique node ID assigned to the LED fixture, such that the entire string of LEDs is not modulated but instead only the subset of LEDs is switched on and off to implement nonvisible light modulation.

2. The LED fixture of claim 1, wherein the modulation circuitry comprises a light modulation driver configured to modulate the nonvisible light emitted by the subset of LEDs beyond a cutoff frequency of a response loop of the LED driver, and wherein the cutoff frequency of the response loop of the LED driver is below 10 kHz.

3. The LED fixture of claim 1, wherein the wireless network is a wireless mesh network, and wherein the unique node ID assigned to the LED fixture comprises:

part of a mesh node ID assigned to the LED fixture for the wireless mesh network; and/or part of a network ID assigned to the wireless mesh network; and/or part or all of a unicast address assigned to the LED fixture for the wireless mesh network.

4. The LED fixture of claim 1, wherein the modulation circuitry is configured to encrypt the unique node ID assigned to the LED fixture before modulating the nonvisible light emitted by the subset of LEDs with the unique node ID.

5. The LED fixture of claim 4, wherein the modulation circuitry is configured to encrypt the unique node ID assigned to the LED fixture using a key assigned to the wireless network.

6. The LED fixture of claim 1, wherein responsive to the broadcast of the unique ID, the modulation circuitry is configured to receive one or more commands from the portable wireless electronic device or via the wireless network of LED fixtures and adjust one or more parameters associated with operation of the string of LEDs based on the one or more commands.

7. The LED fixture of claim 6, further comprising a controller configured to adjust a sensitivity level of a sensor included in the LED fixture, based on at least one of the one or more commands.

8. The LED fixture of claim 6, further comprising a controller configured to adjust an intensity and/or color temperature for the string of LEDs, based on at least one of the one or more commands.

9. The LED fixture of claim 1, wherein the switch device is an n-channel power MOSFET (metal-oxide-semiconductor field-effect transistor) coupled in parallel with the subset of LEDs between a drain and a source of the n-channel power MOSFET.

10. An LED fixture, comprising:

a plurality of strings of LEDs electrically connected in parallel between a constant voltage source and ground;

a resistor electrically connected in series between the constant voltage source and each of the strings of LEDs;

an LED driver configured to regulate power to the strings of LEDs in a constant voltage mode;

network connectivity circuitry configured to interface with a wireless network of LED fixtures; and modulation circuitry configured to modulate nonvisible light emitted by a single one of the strings of LEDs with a unique node ID assigned to the LED fixture, to broadcast the unique node ID via electromagnetic radiation towards a portable wireless electronic device in range of the modulated nonvisible light, wherein the modulation circuitry comprises a switch device coupled in series with the single one of the strings of LEDs, wherein the modulation circuitry is configured to control a gate of the switch device based on the unique node ID assigned to the LED fixture, such that only the single one of the strings of LEDs is switched on and off to implement nonvisible light modulation.

11. The LED fixture of claim 10, wherein the modulation circuitry comprises a light modulation driver configured to modulate the nonvisible light emitted by the single one of the strings of LEDs beyond a cutoff frequency of a response loop of the LED driver, and wherein the cutoff frequency of the response loop of the LED driver is below 10 kHz.

12. The LED fixture of claim 10, wherein the wireless network is a wireless mesh network, and wherein the unique node ID assigned to the LED fixture comprises:

part of a mesh node ID assigned to the LED fixture for the wireless mesh network; and/or part of a network ID assigned to the wireless mesh network; and/or part or all of a unicast address assigned to the LED fixture for the wireless mesh network.

13. The LED fixture of claim 10, wherein the modulation circuitry is configured to encrypt the unique node ID assigned to the LED fixture before modulating the nonvisible light emitted by the single one of the strings of LEDs with the unique node ID.

14. The LED fixture of claim 13, wherein the modulation circuitry is configured to encrypt the unique node ID assigned to the LED fixture using a key assigned to the wireless network.

15. The LED fixture of claim 10, wherein responsive to the broadcast of the unique ID, the modulation circuitry is configured to receive one or more commands from the portable wireless electronic device or via the wireless network of LED fixtures and adjust one or more parameters associated with operation of the strings of LEDs based on the one or more commands.

16. The LED fixture of claim 15, further comprising a controller configured to adjust a sensitivity level of a sensor included in the LED fixture, based on at least one of the one or more commands.

17. The LED fixture of claim 15, further comprising a controller configured to adjust an intensity and/or color temperature for the strings of LEDs, based on at least one of the one or more commands.

18. The LED fixture of claim 10, wherein the switch device is an n-channel power MOSFET (metal-oxide-semiconductor field-effect transistor) coupled in series with the single one of the strings of LEDs.

* * * * *